(12) United States Patent
Allard et al.

(10) Patent No.: US 7,407,302 B2
(45) Date of Patent: Aug. 5, 2008

(54) LUMINESCENT POP-UP CANDY

(75) Inventors: Harvey Clovis Allard, Burlington, VT (US); Thomas George Ference, Essex Junction, VT (US)

(73) Assignee: Thomas G. Ference, Essex Junction, VT (US)

( * ) Notice: Subject to any disclaimer, the term of this patent is extended or adjusted under 35 U.S.C. 154(b) by 95 days.

(21) Appl. No.: 11/127,907

(22) Filed: May 12, 2005

(65) Prior Publication Data

US 2005/0252384 A1 Nov. 17, 2005

Related U.S. Application Data

(60) Provisional application No. 60/570,542, filed on May 13, 2004, provisional application No. 60/577,514, filed on Jun. 7, 2004, provisional application No. 60/616,015, filed on Oct. 5, 2004.

(51) Int. Cl.
*F21V 33/00* (2006.01)

(52) U.S. Cl. ..................... 362/109; 362/253; 362/806; 446/485

(58) Field of Classification Search .............. 362/109, 362/202, 208, 253, 806; 426/104, 134; 446/181, 446/485
See application file for complete search history.

(56) References Cited

U.S. PATENT DOCUMENTS

| | | | |
|---|---|---|---|
| 4,914,748 A | 4/1990 | Schlotter et al. | |
| 5,471,373 A * | 11/1995 | Coleman et al. | 362/109 |
| 5,615,941 A * | 4/1997 | Shecter | 362/109 |
| 5,676,988 A * | 10/1997 | Coleman et al. | 426/134 |
| 5,860,732 A | 1/1999 | Coleman et al. | |
| 6,213,616 B1 | 4/2001 | Chien | |
| 6,328,163 B1 * | 12/2001 | Coleman et al. | 206/457 |
| 6,416,800 B1 | 7/2002 | Weber | |
| 6,619,816 B1 | 9/2003 | Johnson | |
| 6,659,619 B2 | 12/2003 | Gordon | |
| 6,811,279 B2 | 11/2004 | Coleman et al. | |
| 6,955,450 B2 * | 10/2005 | Johnson | 362/253 |
| 2002/0159244 A1 | 10/2002 | Plante | |
| 2003/0016529 A1 | 1/2003 | Schuren | |
| 2003/0067772 A1 | 4/2003 | Coleman et al. | |
| 2003/0228828 A1 | 12/2003 | Coleman et al. | |
| 2004/0032731 A1 | 2/2004 | Coleman et al. | |
| 2004/0170020 A1 | 9/2004 | Johnson | |

* cited by examiner

*Primary Examiner*—John A Ward
(74) *Attorney, Agent, or Firm*—Thomas G. Ference

(57) ABSTRACT

An illuminated pop-up candy comprising a housing, cap, moveable candy, moveable illumination system, and switching mechanism. The candy is able to translate and rotate along the length of the housing by the application of pressure to either the candy or the illumination system. The illumination system is switched on and off by touch or translation of the illumination along said housing.

29 Claims, 7 Drawing Sheets ial Patent Applications No. 60/570,542, filed May 13,
LUMINESCENT POP-UP CANDY

RELATED APPLICATIONS

This application claims the benefit of priority of U.S. Provisional Patent Applications No. 60/570,542, filed May 13, 2004, No. 60/577,514, filed Jun. 7, 2004 and No. 60/616,015, filed Oct. 5, 2004 all entitled "Luminescent Pop-up Candy", and all herein incorporated by reference.

FIELD OF THE INVENTION

This invention relates generally to illuminated novelty items. More specifically, it relates to illuminated consumable candies.

BACKGROUND OF THE INVENTION

Light has been used to illuminate candy to generate novelty items through a number of different ways. One example is U.S. Pat. No. 4,914,748 by Schlotter, et. al. The Schlotter invention is based on a flashlight that includes a replaceable candy cylinder attached to the end of it. The flashlight is then turned on to make the candy cylinder glow brightly while being consumed. Coleman et. al., U.S. Pat. No. 5,471,373, expand on the flashlight concept by using it to flash pulses of light onto a candy sucker users face to the beat of music or other sounds made by an integrated circuit. Coleman et. al., U.S. Pat. No. 6,811,279, provides for varied illusions and color variations to be projected onto a candy by the flashlight. Two other U.S. Patent Application Publications by Coleman et.al.: Nos. 2003/0228828 and 2004/0032731 provide for further integration of candy with a flashlight. 2003/0067772 combines a removable candy ring with the flashlight. 2003/0228828 provides for a flashlight that illuminates a candy at one end and a reservoir at the other end that contains confection powder for dipping the illuminated candy.

U.S. Pat. No. 6,619,819 and U.S. Patent Application Publication No. 2004/0170020 to Johnson, U.S. Pat. No. 6,659,619 to Gordon and U.S. Patent Application Publication 2003/0016529 by Schuren et. al. are all directed to various apparatus for making candy luminescent by transmitting light from a light source along a tube into the candy. The Johnson patent further provides for a reflective coating inside the tube to enhance light transmission along the tube.

In other examples the properties of the candy itself can be used to enhance the illumination effect. Weber et.al., U.S. Pat. No. 6,416,800, provides for edible fiber optic candies that transmit light, while Coleman et. al., U.S. Pat. No. 5,860,732, provide for a flashlight with illuminated liquid candy.

In yet another example, the source of light for illuminating the candy may not be that of a power supply and light source, as in the preceding examples, but that of chemical luminescence. U.S. Patent Application Publication No. 2002/0159244 describes such a chemiluminescent lollipop.

There is a significant degree of amusement value provided by the devices described in the prior art patents and publications referenced above. However, it will be apparent to those skilled in the art that opportunity exists for enhancing the aesthetic appeal, amusement level, structural design and commercial viability of illuminated consumables. For example, candies such as the PUSH POPS® candy manufactured by The Topps Company possess a unique design in which the candy is stored within a housing prior to consumption. The housing acts to keep the candy clean when not in use. Having the candy inside the housing also provides for a more compact product for shipping. The candy is then pushed from the housing by either the consumer's finger or a spring mechanism just prior to consuming. This further lends to the amusement value of the product. The prior art only provides for illuminating candy that is secured outside the housing. The prior art is not believed to teach or suggest illuminating a candy structure such as the PUSH POPS® candy.

SUMMARY OF THE INVENTION

One aspect of the present invention is to provide a method for illuminating a pop-up candy. The method includes providing a pop-up candy having an elongated housing with an interior, a longitudinal axis and first and second ends. Then, a candy is positioned within the interior of the elongated housing. This candy is movable along and rotatable about the longitudinal axis of the housing. The method further includes moving the candy along and rotating the candy about the longitudinal axis and illuminating the candy during this step.

In another aspect, the invention is directed to an illuminated confection apparatus comprising an elongated housing having a longitudinal axis and an interior having first and second positions. A connector is positioned in the interior and movable along the longitudinal axis between the first and second positions. A candy is disposed proximate the connector. An illumination system including a power and light source transmits light toward the candy. A switch connects the power source to light source when the connector is moved a first distance away from the first position and disconnects the source of power from the light source when the connector is in the first position.

In yet another aspect, the present invention is directed to an illuminated confection apparatus comprising a housing having a longitudinal axis, a first end and a second end. A support is disposed for axial movement along, and rotational movement about, the longitudinal axis of the housing. A candy is attached to the support so as to move with the support. An illumination system is provided for transmitting light toward the candy. The illumination system including a source of power, a light source proximate the support that is capable of transmitting light toward the candy, and a switch that connects the source of power to the light source while permitting the support and the candy to move along and rotate about the longitudinal axis of the housing.

In an additional aspect, the invention is directed to an illuminated confection apparatus comprising an elongated housing having a longitudinal axis, a first end and an interior. A candy is disposed in the interior and movable along the longitudinal axis between first and second positions. A light source is positioned in the interior proximate the candy and movable with the candy between the first and second positions. The light source including a light, a source of power, and a switch assembly for connecting the source of power to the light wherein the switch assembly includes a first contact for connecting the source of power to the light and a bias assembly for urging the source of power against the contact when the light source has moved away from the first position a first distance toward the second position.

BRIEF DESCRIPTION OF DRAWINGS

The foregoing and other aspects and advantages of the invention will be apparent from the following detailed description of the invention, as illustrated in the accompanying drawings, in which.

DETAILED DESCRIPTION OF THE INVENTION

Figure 1:
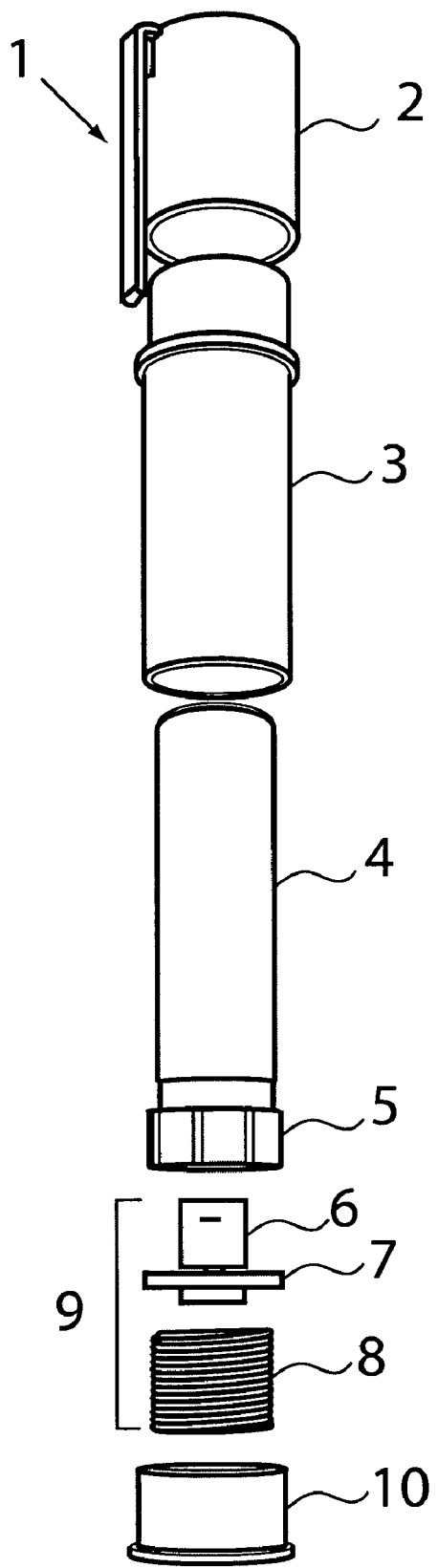
FIG. 1 is an exploded perspective view showing the elements that form one embodiment of an illuminated pop-up candy.
Figure 2A:
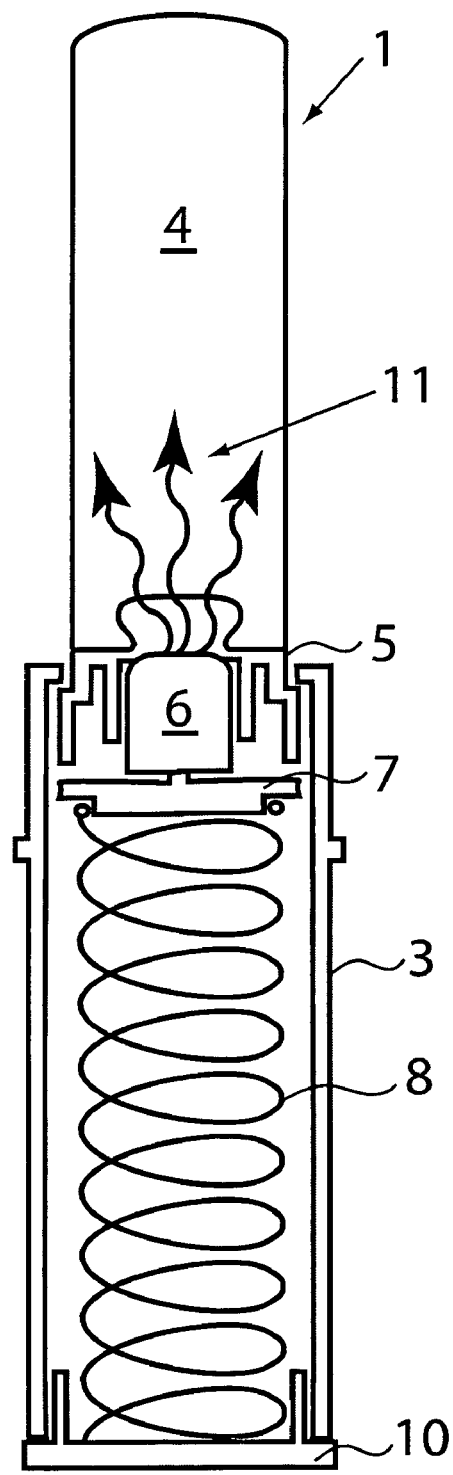
FIGS. 2a and 2b are cross-sectional, side elevation, schematic diagrams of assembled elements from FIG. 1 forming an illuminated pop-up candy that uses the inherent pop-up action to automatically actuate the light source, with FIG. 2a showing the candy in the extended position and FIG. 2b showing the candy in the retracted position.
Figure 2B:
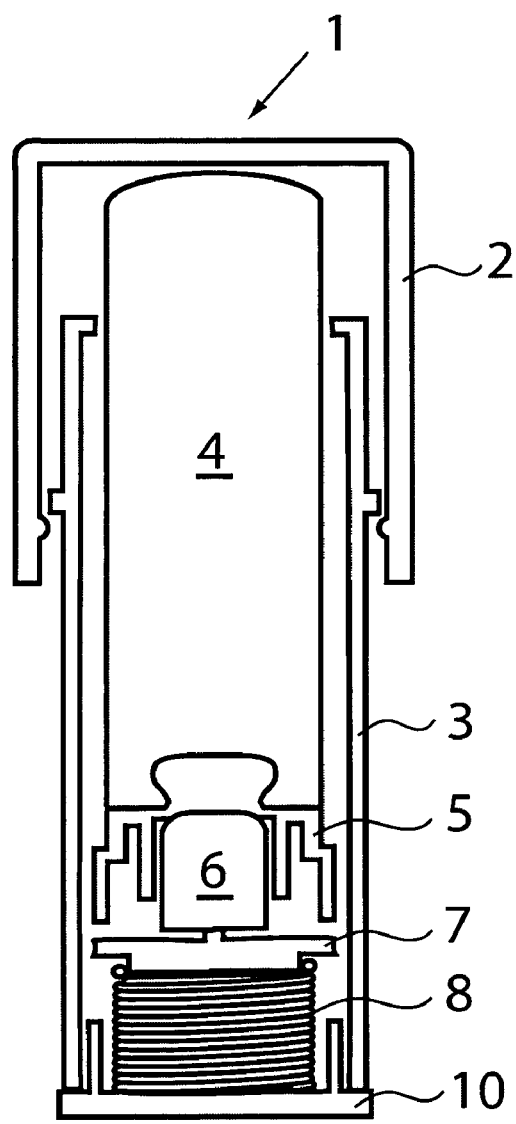

An illuminated pop-up candy apparatus in accordance with the principles of the present invention is illustrated in FIG. 1, FIG. 2a and FIG. 2b. Candy apparatus 1 includes a cap 2 that fits on top of a cylindrical housing 3. Candy 4, which may be substantially or partially translucent, is secured to moveable connector (aka support) 5 in which illumination system 6 is placed. Typically, moveable connector 5 is substantially transparent or is at least partially translucent, although in some embodiments it may be opaque or may be opaque and include a translucent or transparent portion. Apparatus 1 includes a plunger 7 that has a protrusion that fits within a hole in the base of illumination system 6. Together illumination system 6, plunger 7 and a large spring 8 make up switching system 9. Large spring 8 also acts to apply pressure to candy 4 and push it out of the opening in housing 3 when cap 2 is off. Base 10 is used to secure all of the components within housing 3. In the illuminated state, light 11 is emitted from illumination system 6 and transmitted through moveable connector 5 into candy 4.

Figure 3:
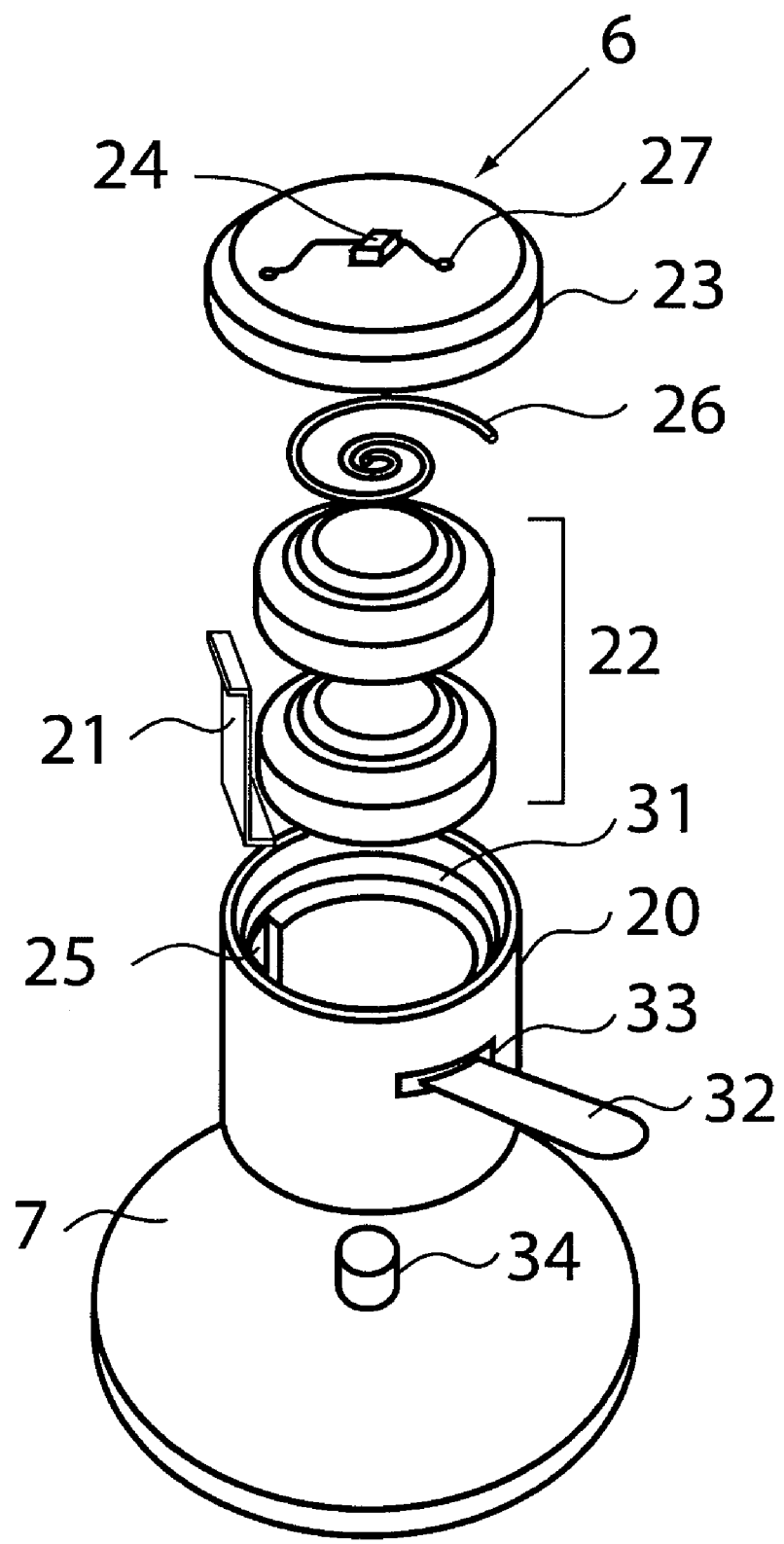
FIG. 3 is an exploded perspective view showing the elements that form the illumination system for the illuminated candy depicted in FIG. 1 and FIG. 2.
Figure 4A:
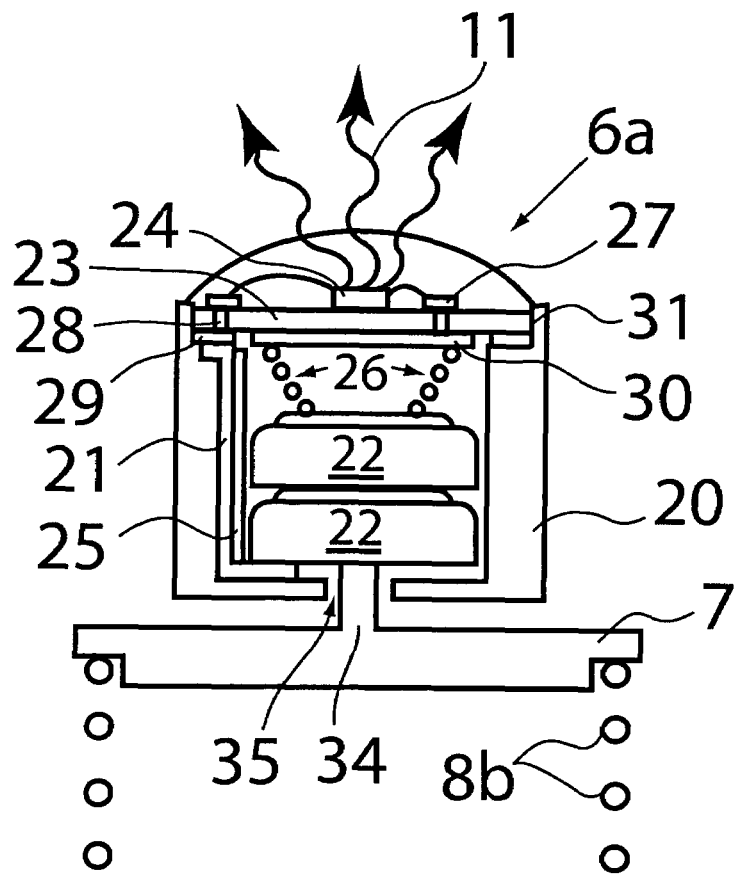
FIG. 4a is a cross-sectional, side elevation, schematic diagram of the assembled elements from FIG. 3 showing the relation between elements of the illumination system in the illuminated state.
Figure 4B:
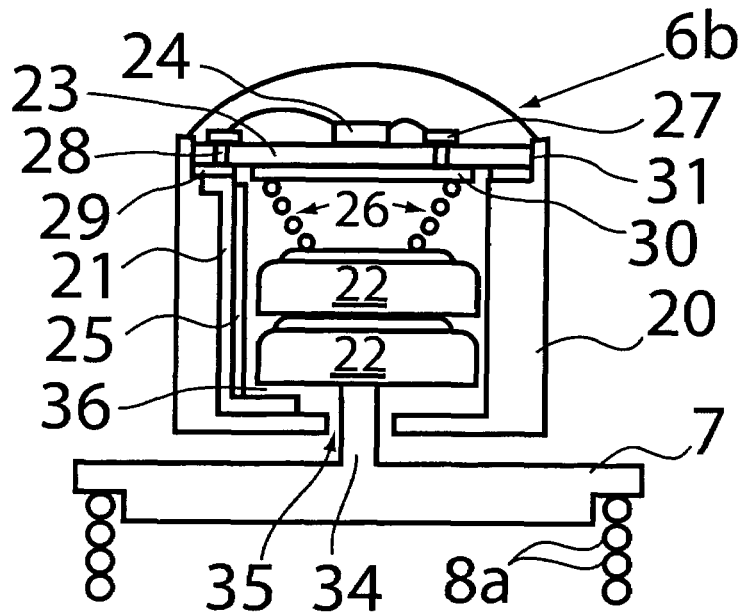
FIG. 4b is a cross-sectional, side elevation, schematic diagram of the assembled components from FIG. 3 showing the relation between elements of the illumination system in the non-illuminated state.

The details of one embodiment of illumination system 6 are illustrated in FIG. 3, FIG. 4a and FIG. 4b and described below. Illumination system 6 includes a containment structure 20. Within containment structure 20 is placed a shaped metal or other conductive strip 21 that makes electrical contact between the base of batteries 22 and the base of circuit board 23. Strip 21 may reside partially within a slot 25 in containment structure 20 so as to be electrically insulated from the edge of batteries 22. Containment structure 20 may be made from a non-electrically conductive material, or may be lined with a non-conductive material adjacent strip 21 and batteries 22 or everywhere. A small electrically conductive spring 26 is placed between the base of circuit board 23 and the top of battery 22.

The top side of circuit board 23 contains light source 24 bonded to metal pads 27 and encapsulated in a clear epoxy. The light source may be a bulb or light emitting diode (LED) and can be electrically bonded by wire bonds, solder or any other appropriate electrical contact. Metal pads 27 are electrically connected by metal studs or vias 28 to metal pads 29 and 30 on the bottom side of circuit board 23. Additional circuitry and controller chips can be incorporated into circuit board 23 to make light source 24 light up and flash when illumination system 6 is activated. Circuit board 23 is snapped into a ridge 31 in the top of containment structure 20 to lock all pieces in place and complete an electrical circuit. Alternatively, circuit board 23 may be glued in place and solder used to make electrical contact with strip 21. Other attachment and connection schemes may also be employed. An insulating strip 32 can be placed between spring 26 and the top of battery 22, through a slot 33 in the side of containment structure 20, to keep the electrical circuit open during manufacturing so as to not drain the batteries. When illumination system 6 is integrated with illuminated pop-up candy housing 3, insulating strip 32 may be removed to activate the illumination system.

Assembly of the illuminated pop-up candy occurs by securing candy 4 to moveable connector 5 and then positioning the candy and connector into the interior of housing 3. Illumination system 6 is placed within moveable connector 5. Plunger 7 with protrusion 34 is then aligned to a hole 35 in the bottom of illumination system 6. Large spring 8 is then placed in housing 3 and base 10 press fit to seal the housing. Candy 4, connector 5, illumination system 6, plunger 7 and spring 8 are all sized so that they may be moved along and rotated about the long axis of housing 3 within the interior of the housing.

Actuation of the illumination system 6 occurs as follows. When large spring 8 is in a compressed state 8a, as in the case where the candy resides within housing 3, enough pressure is applied to small spring 26 to open the electrical circuit by pushing the base of battery 22 away from conductive strip 21 to create gap 36. In this state the electrical circuit is open and candy 4 is not illuminated. When candy 4 is allowed to pop out of housing 3, large spring 8 expands toward a non-compressed state 8b. During this expansion, large spring 8 drives connector 5 and illumination system 6 away from base 10 toward the open end of housing 3. When connector 5 has been urged by large spring 8 a predetermined distance away from base 10, e.g., 1 cm (0.4"), this reduces the force enough on small spring 21 to allow it to urge batteries 22 into contact with conductive strip 21. This contact, together with the electrical contact created by small spring 26 between metal pad 30 and the top battery 22, closes the illumination circuit, thereby resulting in the delivery of power from batteries 22 to light source 24. With cap 2 on, the illumination system 6 is shut off and candy 4 is protected and kept clean. With cap 2 off, candy 4 pops out of housing 3 and illumination system 6 is turned on automatically.

Variations of the previously described automatic switching system 9 maybe integrated with the pop-up illuminated candy. In general a bias is used in cooperation with the connector to urge the connector from a first position to a second position. One example includes two electrical contacts, one at the top of the housing 3 and another at the top of the moveable connector 5, coming together. In another example an elastic band with an electrical contact at the end is pulled towards a second electrical contact as large spring 8 expands. In yet another example the use of magnets and magnetic fields can be used to bring two contacts together. These are just a few examples of various switching means that work within the scope of the present invention. However, these switching means are all based on the concept that as large spring 8 expands pushing candy 4 out of housing 3, the two electrical contacts of a switching system 9 get closer together. At some point, when candy 4 is displaced far enough out of housing 3, the contacts of switching system 9 make contact and candy 4 is illuminated.

Figure 5A:
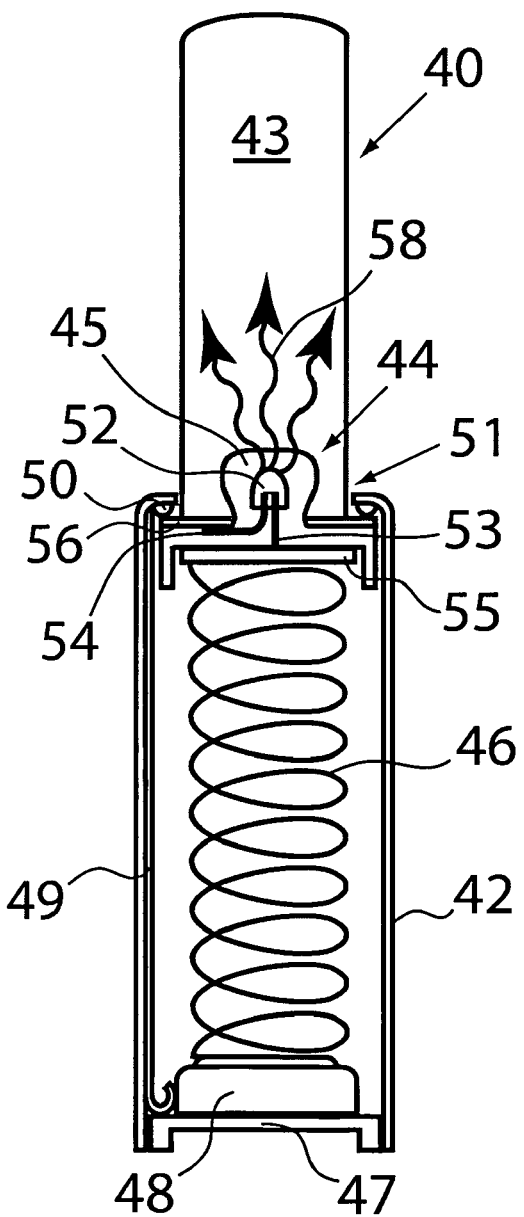
FIGS. 5a and 5b are cross-sectional, side elevation, schematic diagrams of another embodiment of an illuminated pop-up candy that uses the inherent pop-up action to automatically actuate the light source, with FIG. 5a showing the candy in the extended position and FIG. 5b showing the candy in the retracted position.
Figure 5B:
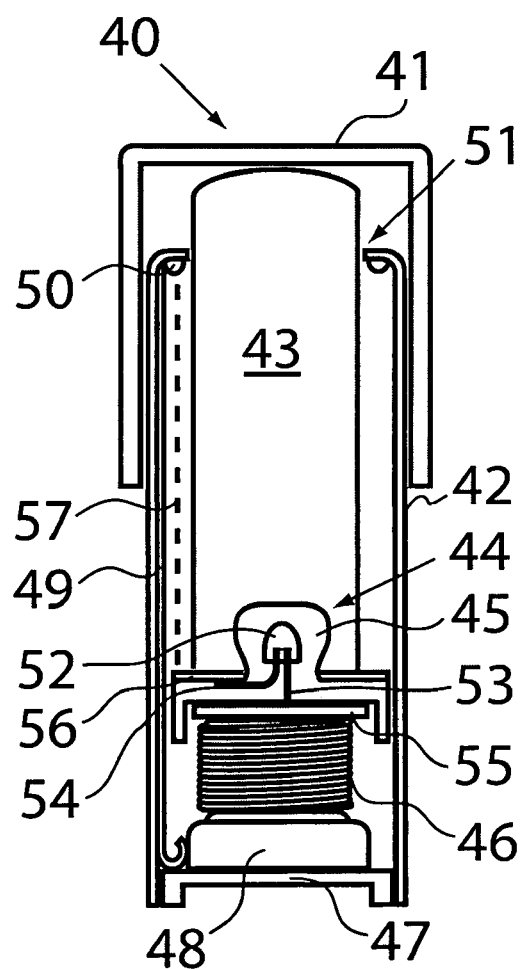

FIG. 5a and FIG. 5b depict another embodiment of the present invention incorporating one of these different switching means. Candy apparatus 40 includes a cap 41 that fits on top of cylindrical housing 42. A substantially translucent candy 43 is attached or disposed proximate to moveable illumination system 44 by connector 45. A large spring 46 is placed between moveable illumination system 44 and the housing base 47 used to secure all components within the housing 42. Large spring 46 acts to apply pressure to candy 43 and push it out of opening 51 in housing 42 when cap 41 is off. The large spring also acts as electrical wiring between illumination system 44 and power source 48. Conductive strip 49 runs along the inside length of housing 42 making electrical contact with power source 48 at housing base 47 and having an negative electrical contact point 50 near opening 51 in the housing. Illumination system 44 comprises a light source 52 with a positive lead 53 and a negative lead 54. Positive lead 53 is electrically connected to conductive large spring 46 through a conductive pad 55. Negative lead 54 is connected to a positive electrical contact point 56 on top of moveable illumination system 44.

FIG. 5b shows the switching mechanism in the off state. Here the large spring 46 is substantially compressed. Positive electrical contact point 56 is separated from electrical negative contact point 50 by gap 57. When large spring 46 is in the compressed state, contact points 50 and 56 are separated by gap 57. As cap 41 is taken off, large spring 46 expands reducing the length of gap 57 until negative electrical contact point 50 and positive electrical contact point 56 touch activating the illumination system 44. FIG. 5a shows the switching mechanism in the on state with zero gap length and light 58 illuminating candy 43.

Figure 6A:
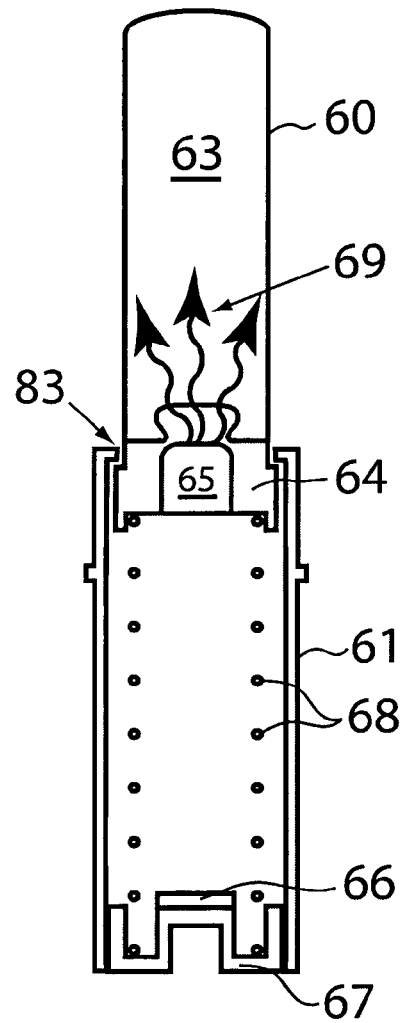
FIG. 6a is a cross-sectional, side elevation, schematic diagram of another embodiment of an illuminated pop-up candy that uses the inherent pop-up action combined with a magnet to automatically actuate the light source.

In yet another embodiment of the present invention, FIG. 6a, a magnetic field generated by a permanent magnet is used to automatically switch the illuminated pop-up candy on and off. Candy apparatus 60 includes a cylindrical housing 61. A substantially translucent candy 63 is secured to a moveable connector 64 in which illumination system 65 is secured or placed proximate to. Translucent candy 63, moveable connector 64 and illumination system 65 are all able to rotate and translate along the long axis of housing 61. A permanent magnet 66 is attached to base 67. Together illumination system 65, magnet 66 and large spring 68 make up the switching system. Large spring 68 also acts to apply pressure to candy 63 and push it out of opening 83 in housing 61 when the cap is off. In the illuminated state 65a, light 69 is emitted from illumination system 65 and transmitted through moveable connector 64 into substantially translucent candy 63.

Figure 6B:
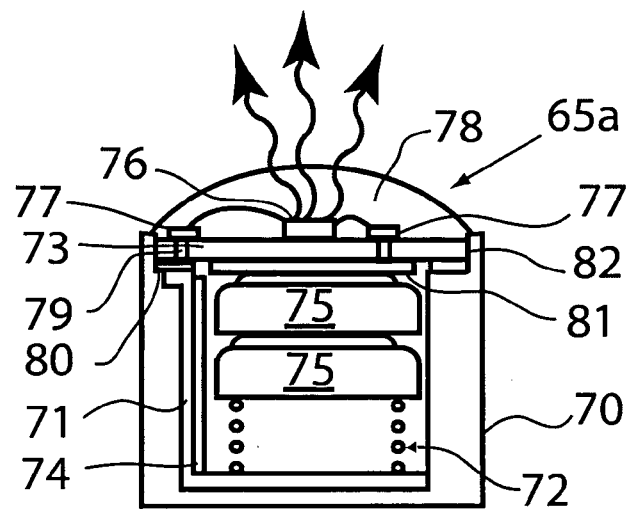
FIG. 6b is a cross-sectional, side elevation, schematic diagram showing the relation between elements of the illumination system of FIG. 6a in the illuminated state.
Figure 6C:
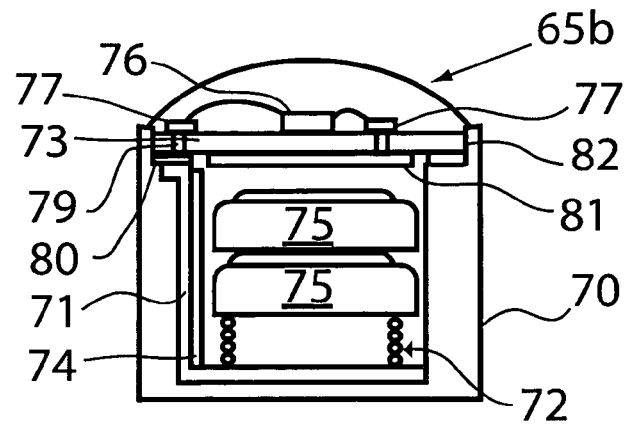
FIG. 6c is a cross-sectional, side elevation, schematic diagram showing the relation between elements of the illumination system of FIG. 6a in the non-illuminated state.

The details of the illumination system 65 are diagramed in FIG. 6b and FIG. 6c. Illumination system 65 includes a containment structure 70. Within this containment structure is placed a shaped conductive metal strip 71 that makes electrical contact between small conductive spring 72 and the base of the circuit board 73. This conductive metal strip can reside partially within a slot 74 in containment structure 70 so as to be electrically insulated from the edge of the batteries. Small conductive spring 72 is placed between the exposed portion of metal strip 71 and the base of the battery 75. The top side of the circuit board 73 contains a light source 76. This may be an LED wire bonded to metal pads 77 and encapsulated in clear epoxy 78. Metal pads 77 are electrically connected by metal through holes 79 to metal pads 80 and 81 on the bottom side of the circuit board. Additional circuitry and controller chips can be incorporated into the circuit board to make the light source 76 light up and flash when illumination system 65 is activated. Circuit board 73 is snapped into a ridge 82 in the top of containment structure 70 to lock all pieces in place and complete an electrical circuit.

Actuation of the illumination system occurs as follows. When candy 63 resides within housing 61 illumination system 65 is in close proximity to permanent magnet 66, FIG. 6c. When illumination system 65 is in close proximity to permanent magnet 66, it senses a strong magnetic field. The magnetic field creates a pulling force on the feromagnetic casing of batteries 75 that is balanced by a pushing force on the battery from small spring 72. In close proximity to magnet 66, the pulling force is large enough to overcome the pushing force from small spring 72. This pulls battery 75 away from the base of the circuit board creating an open circuit. With the illumination circuit open, candy 63 is in a non-illuminated state 65b. When the cap is removed from candy housing 61, FIG. 6b, large spring 68 pushes candy 63 with attached illumination system 65 out of opening 83 in housing 61. The force of large spring 68 is large enough to overcome the magnetic attraction force between the casing of battery 75 and magnet 66. Once illumination system 65 with attached candy 63 is translated a sufficient distance away from permanent magnet 66, the magnetic field becomes weak. The force from small spring 72 is now greater than the magnetic attraction between the battery casing and permanent magnet 66 and battery 75 makes contact with the base of circuit board 73. This completes the electrical circuit and candy 63 goes into illuminated state 65a.

Figure 7A:
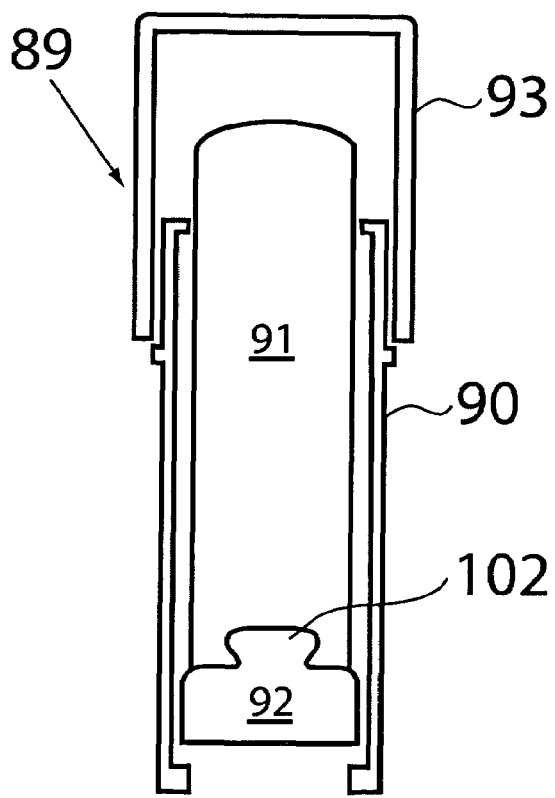
FIG. 7a is a cross-sectional, side elevation, schematic diagram of a design for an illuminated pop-up candy in the non-illuminated state.
Figure 7B:
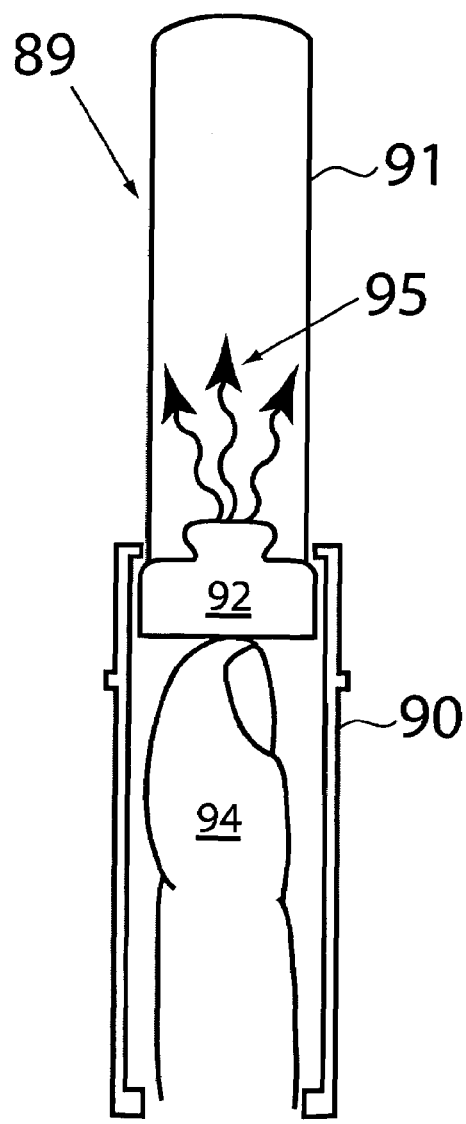
FIG. 7b is a cross-sectional, side elevation, schematic diagram of a design for an illuminated pop-up candy whereby the force of an individuals finger pushes the candy up through the opening in a housing and actuates the illumination source.
Figure 7C:
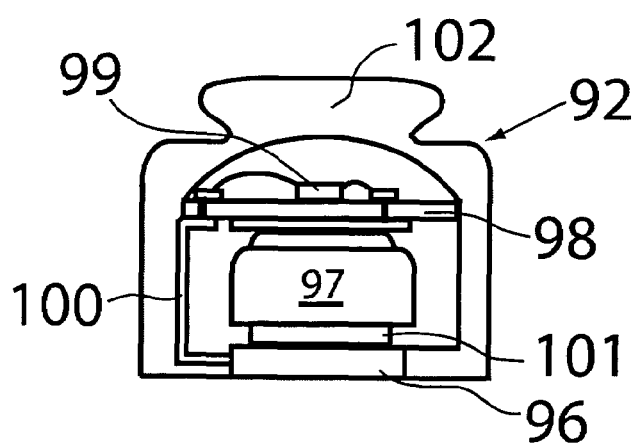
FIG. 7c is an enlarged, cross-sectional, side elevation, schematic diagram of the illumination system in FIG. 7a and FIG. 7b.

In still another embodiment of the present invention, the housing for the candy has an opening at both ends. Here it is the touch of a finger, rather than a switching system that incorporates a large spring, which actuates the illumination system and pushes the candy from the housing. FIGS. 7a, 7b and 7c illustrate this embodiment of the invention. Apparatus 89 includes a cylindrical housing 90 with openings at both ends. A substantially translucent candy 91 is secured by connector 102 to moveable illumination system 92. With cap 93 on housing 90, candy 91 resides substantially within the housing. With cap 93 removed, a consumer can put a finger 94 within the opening at the base of housing 90 and push candy 91 out of the top opening of the housing and lick the candy. The act of touching the base of moveable illumination system 92 causes an electrical circuit to be made. When the electrical circuit is made, illumination system 92 is activated and light 95 illuminates candy 91. A touch sensitive switch 96 is located at the base of moveable illumination system 92. This touch sensitive switch 96 may be anyone of a number of switches based on pressure, capacitance or resistance.

In more detail, FIG. 7c, illumination system 92 includes a power source 97 a circuit board 98 with integrated light source 99. An electrical lead 100 connects circuit board 98 to touch sensitive switch 96. Touch sensitive 96 switch makes electrical contact with battery 97 through conductive pad 101.

While several embodiments of the invention, together with modifications thereof, have been described in detail herein and illustrated in the accompanying drawings, it will be evident that various further modifications are possible without departing from the scope of the invention. Nothing in the above specification is intended to limit the invention more narrowly than the appended claims. The examples given are intended only to be illustrative rather than exclusive.

What is claimed is:

1. A method of illuminating a pop-up candy, comprising the steps of:
    a) providing pop-up candy having (i) an elongate housing with an interior, a longitudinal axis and first and second ends and (ii) a candy positioned in said interior and movable along said longitudinal axis;
    b) moving said candy along said longitudinal axis; and
    c) illuminating said candy during said step b) by transmitting light into said candy.

2. A method according to claim 1, wherein said illuminating step involves illuminating said candy after it has moved a first distance away from said first end of said housing.

3. A method according to claim 1, wherein said providing step further includes providing said pop-up candy having an illumination system that moves with said candy.

4. An apparatus for illuminating a confection, comprising:
    a) an elongate housing having a longitudinal axis and an interior having first and second positions;
    b) a connector positioned in said interior and movable along said longitudinal axis between said first and second positions;
    c) a candy disposed proximate said connector;
    d) an illumination system that transmits light into said candy, said illumination system including a source of power and a light source; and
    e) a switch that connects said source of power to said light source when said connector is moved a first distance away from said first position and disconnects said source of power from said light source when said connector is in said first position.

5. An apparatus according to claim 4, wherein said candy is attached to said connector.

6. An apparatus according to claim 4, wherein at least a portion of said connector is capable of transmitting light.

7. An apparatus according to claim 4, wherein said connector is at least one from the group including a substantially transparent connector, an at least partially translucent connector, and an opaque connector with a transparent or translucent portion.

8. An apparatus according to claim 4, further comprising a bias cooperating with said connector for urging said connector from said first position toward said second position.

9. An apparatus according to claim 8, wherein said bias includes at least one from the group including a spring and an elastic band.

10. An apparatus according to claim 4, wherein said switch includes a spring for urging said power source into electrical contact with said light source and a magnet for pulling said power source out of electrical contact with said light source.

11. An apparatus according to claim 4, wherein said switch includes a touch-sensitive element that connects said power source with said light source when touched by a user.

12. An apparatus according to claim 4, wherein said light source is a light-emitting diode and said illumination system includes a circuit board on which said light-emitting diode is positioned.

13. An apparatus for illuminating a confection, comprising:
    a) a housing having a longitudinal axis, a first end and a second end;
    b) a support disposed for axial movement along, and rotational movement about, said longitudinal axis;
    c) a candy attached to said support so as to move with said support; and
    d) an illumination system for transmitting light into said candy, said illumination system including a source of power, a light source proximate said support that is capable of transmitting light into said candy, and a switch that connects said source of power to said light source while permitting said support and said candy to move along and rotate about said longitudinal axis of said housing.

14. An apparatus according to claim 13, further including a bias for urging said support toward said second end.

15. An apparatus according to claim 13, wherein said switch includes a conductive element connected to said light source and a spring positioned between said conductive element and said source of power that is capable of transmitting electrical current between said source of power and said conductive element.

16. An apparatus according to claim 13, wherein said switch includes a touch-sensitive element that connects said source of power with said light source when touched by a user.

17. An apparatus for illuminating a confection, comprising:
    a) an elongate housing having a longitudinal axis, a first end and an interior;
    b) a candy disposed in said interior and movable along said longitudinal axis between first and second positions;
    c) a light source positioned in said interior proximate said candy and movable with said candy between said first and second positions, said light source including a light, a source of power, and a switch assembly for connecting said source of power to said light, wherein said switch assembly includes a first contact for connecting said source of power to said light and a bias assembly for urging said source of power against said contact when said light source has moved away from said first position a first distance toward said second position.

18. An apparatus according to claim 17, wherein said bias assembly includes:
    a) a first member disposed proximate said source of power and movable within said interior;
    b) a first spring positioned in said interior between said first end and said first member;
    c) a second member disposed proximate said source of power opposite said first member; and
    d) a second spring positioned between said second member and said source of power, wherein said second spring urges said source of power into electrical contact with said contact when said light source is moved away from said first position said first distance.

19. An apparatus according to claim 18, wherein said second spring electrically connects said source of power with said light.

20. An apparatus according to claim 18, where said first and second springs have lengths and spring coefficients selected so that when said light source is positioned less than said first distance from said first position said first spring exerts, via said first member, a greater force on said source of power than said second spring exerts on said source of power.

21. An apparatus according to claim 17, wherein said switch includes a magnet for causing said source of power to move relative to said first contact.

22. An apparatus according to claim 17, wherein said switch includes a touch-sensitive element.

23. A method according to claim 1, wherein said moving step involves using a bias interior said housing to move said candy.

24. An apparatus for illuminating a confection, comprising:
   a) an elongated housing having an opening at one end;
   b) a candy, a light source and a bias assembly disposed within said elongated housing; and
   c) wherein when said candy is urged from a first position to a second position through said opening by said bias assembly, said light source is activated to transmit light into said candy.

25. An apparatus according to claim 24, wherein said light source is proximate to and movable with said candy.

26. An apparatus according to claim 24, wherein said bias assembly includes at least one from the group including a spring, and an elastic band and a magnet.

27. An apparatus according to claim 4, wherein said illumination system moves with said connector.

28. An apparatus according to claim 4, wherein said illumination system is within said connector.

29. An apparatus according to claim 4, wherein said candy is translucent.

* * * * *